United States Patent
Gauley et al.

[11] Patent Number: 5,877,429
[45] Date of Patent: Mar. 2, 1999

[54] FLOW METER

[75] Inventors: William H. Gauley, 6719 Glen Erin Drive, Apt. 402, Mississauga, Ontario, Canada, L5N 3S6; Stacey W. Nichol, Ontario, Canada

[73] Assignee: William H. Gauley, Brampton, Canada

[21] Appl. No.: 901,263

[22] Filed: Jul. 28, 1997

[51] Int. Cl.⁶ .................................................. G01F 15/00
[52] U.S. Cl. .................................................. 73/861.77
[58] Field of Search .................. 73/861.77; 277/607, 277/605, 625, 626

[56] References Cited

U.S. PATENT DOCUMENTS

| | | |
|---|---|---|
| 439,442 | 10/1890 | Thorne et al. |
| 2,822,688 | 2/1958 | Wiley. |
| 3,053,087 | 9/1962 | Waugh. |
| 3,279,496 | 10/1966 | Klass et al. |
| 4,098,308 | 7/1978 | Purdum ................................ 277/605 |
| 4,275,291 | 6/1981 | Feller ................................... 73/861.77 |
| 4,342,462 | 8/1982 | Carlesimo ............................ 277/607 |
| 4,659,868 | 4/1987 | Sala ..................................... 277/607 |
| 4,674,338 | 6/1987 | Carpenter ............................ 73/861.77 |
| 4,700,579 | 10/1987 | Hall. |
| 5,014,368 | 5/1991 | Wolfgang. |
| 5,187,989 | 2/1993 | Bulteau. |
| 5,259,251 | 11/1993 | Brinster et al. ...................... 73/861.77 |
| 5,433,118 | 7/1995 | Castillo ............................... 73/861.77 |
| 5,721,383 | 2/1998 | Franklin et al. ...................... 73/861.77 |

*Primary Examiner*—George Dombroske
*Assistant Examiner*—Jewel V. Thompson
*Attorney, Agent, or Firm*—Barrigar & Moss

[57] ABSTRACT

A portable flow meter for measuring the flush volume of a toilet by measuring the volume of water passing through the siphon of the toilet, and for measuring fluid flow through toilet openings of varying sizes. The flow meter has a flow tube with a fluid passageway provided therethrough, and a resilient compressible gasket is mounted on the flow tube to prevent fluid from circumventing the fluid passageway. A rotor is disposed within the fluid passageway for rotation by fluid passing therethrough, and means are provided for counting the rotations of the rotor and generating an output representative of the volume or flow rate of fluid passing through the fluid passageway. A handle extends upwardly from the flow tube, and a digital display is provided on the handle for displaying the output.

21 Claims, 4 Drawing Sheets

FLOW METER

BACKGROUND OF THE INVENTION

The invention relates to fluid flow meters and more particularly to portable flow meters that can be used to determine the volume of fluid passing through an opening with unknown dimensions, such as the discharge opening which leads to the siphon of an installed toilet bowl.

As a result of increasing conservational awareness and rising water costs, the efficiency of toilets has become of greater concern in recent years. This has resulted in various water saving innovations, such as the development of low flow toilets which use a reduced volume of water with each flush. Municipalities and publicly owned water authorities often provide subsidies for landlords and other building owners to replace inefficient high flush volume toilets with low flow toilets. Nonetheless, to date it has been inconvenient to accurately measure the flush volume of existing toilets installed in a building or other site in order to determine whether it was feasible (from the perspectives of the landlord or owner and the subsidizing authority) to replace the existing toilets with low flow toilets. It has also been difficult to accurately determine the flush volume of new toilets.

In the past, in order to determine the flush volume of an installed toilet it has generally been necessary to disconnect the water supply line going to the toilet and install an inline flow meter in the supply line. This procedure is quite time consuming, with the result that only a relatively small number of toilets could be tested during a water consumption audit of a building or site. Furthermore, as the supply line for flush valve toilets commonly found in commercial buildings are typically located behind finished walls and therefor difficult to access (when compared to flush tank toilets), measurement of the flush volume of installed flush valve toilets has heretofore been impractical with conventional measuring devices.

In the past, various flow meter designs have been proposed for a range of purposes. For example, U.S. Pat. No. 4,700,579 issued Oct. 20, 1987 to Hall discloses a digital flow meter for mounting in a flow delivery line. The meter housing is threaded at opposite ends for coupling to the delivery line. U.S. Pat. No. 3,053,087 issued Sep. 11, 1962 to Waugh also discloses a flow meter threaded at opposite ends for connection to a flow delivery line. Both these flow meters require that the flow delivery line be broken in order for the flow meter to be used, which is inconvenient and time consuming when several tests must be taken at different locations.

It is therefore desirable to provide a portable flow meter which can be efficiently used to measure the flush volume of a toilet by measuring the volume of water passing through the siphon of the toilet. It is also desirable to provide a portable flow meter that can be efficiently used to measure the volume of fluid passing through an opening of unknown diameter.

SUMMARY OF THE INVENTION

According to one aspect of the invention there is provided a portable flow meter for determining the flush volume of a toilet having a toilet bowl with a discharge opening. The flow meter comprises a flow tube having a fluid passageway therethrough, a rotor having blades and disposed in the fluid passageway for rotation by the flow of fluid through the fluid passageway, detection means for detecting rotation of the rotor and generating an output in response thereto which is representative of the volume of fluid passing through the fluid passageway, display means for displaying the output, and a resilient compressible gasket mounted on the flow tube. In use, the flow tube together with the gasket can be positioned in the toilet bowl such that substantially all fluid passing through the discharge opening during the flush cycle of the toilet will be forced through the fluid passageway. Preferably, the flow meter includes an elongate handle having an upper end and a lower end, the lower end being connected to the flow tube.

Preferably, a display housing is connected to the upper end of the handle, and the display means includes a digital display mounted in the housing and the handle is of sufficient length to support the display housing above a high water mark of the toilet bowl when the flow meter is in use.

Preferably, the gasket is made from water impermeable material and is removably mounted on the flow tube. The gasket may be secured to the flow tube by frictional engagement therebetween. The gasket is preferably made from closed cell sponge.

Preferably the detection means comprises a magnetic field affecting means carried by at least one of the blades, sensor means mounted on the flow tube for generating electrical signals in response to the movement of the magnetic field affecting means caused by rotation of the rotor, and a control circuit for counting the signals and generating the output in response to the electrical signals.

According to a further aspect of the invention, there is provided a portable flow meter for measuring the flow of fluid through different openings having a range of sizes. The portable flow meter comprises a flow tube having an axial fluid passageway therethrough, measuring means for measuring the flow of fluid through the fluid passageway, the measuring means including a rotor disposed in the fluid passageway and rotatable solely by the flow of fluid through the fluid passageway, and display means for displaying an output from the measuring means. A resilient compressible water impermeable gasket member extends around an outer periphery of the flow tube, and the gasket member and the flow tube are arranged such that when in use the gasket member can provide a substantially fluid tight seal between the flow tube and the periphery of the opening through which the flow of fluid is being measured so that substantially all fluid passing through the opening will pass through the fluid passageway.

In a preferred embodiment, the flow meter includes an elongate handle having an upper end and a lower end, the lower end being connected to the flow tube. Preferably the rotor has a plurality of blades, the measuring means includes magnetic field affecting means located on at least one of the blades, sensor means mounted on the flow tube for generating electrical signals in response to the movement of the magnetic field affecting means caused by rotation of the rotor, and a control circuit for counting the signals and generating an output representative of the volume of liquid passing through the fluid passageway. The display means may comprise a digital display located at the upper end of the handle for displaying the output.

A further aspect of the present invention provides a method for measuring the flush volume of a toilet having a toilet bowl discharge opening. The method comprises the steps of providing a flow tube having an axial fluid passageway therethrough and a resilient compressible gasket mounted thereon, providing means for measuring and displaying the volume of fluid passing through the fluid passageway, inserting a portion of the flow tube into the discharge opening until the gasket forms a substantially water impermeable seal between the flow tube and the walls of the discharge opening so that substantially all fluid passing through the discharge opening will pass through the fluid passageway, activating the flush cycle of the toilet, and measuring the volume of fluid passing through the passageway joining the flush cycle with the measuring and display means.

The present invention will be understood and appreciated more fully from the following detailed description, taken in conjunction with the accompanying drawings.

BRIEF DESCRIPTION OF THE DRAWINGS

A detailed description of a preferred embodiment is provided below with reference to the following drawings, in which.

DESCRIPTION OF THE PREFERRED EMBODIMENTS

Figure 1:
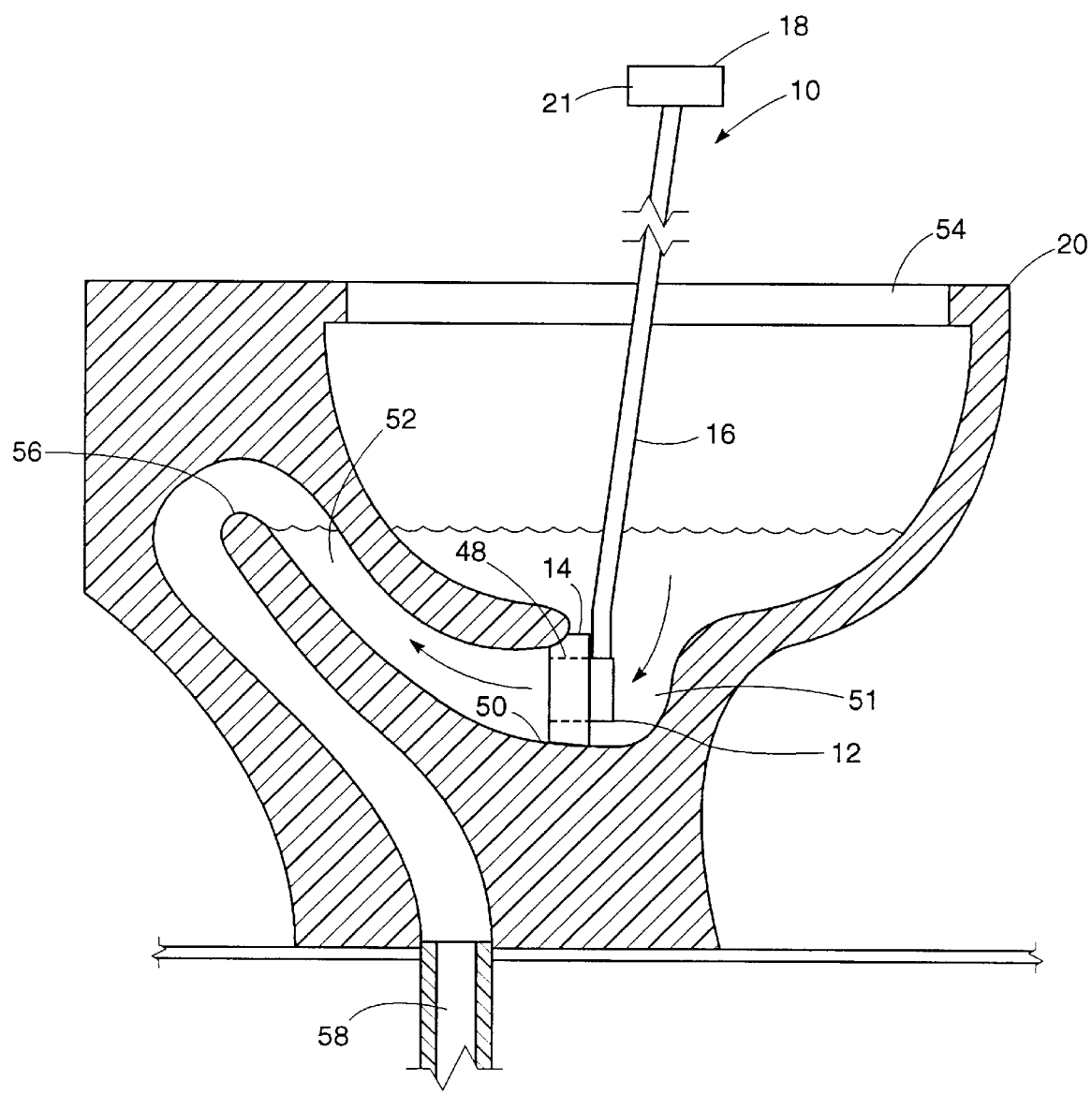
FIG. 1 is a cross-sectional elevation illustrating a flow meter in accordance with a preferred embodiment of the present invention inserted in the siphon opening of a toilet bowl.

FIG. 1 illustrates a flow meter in accordance with the present invention, indicated generally by 10, inserted into a toilet bowl 20. The flow meter 10 includes a hollow cylindrical flow tube 12 on which a resilient compressible gasket member 14 is mounted. An elongate hollow tubular handle 16 extends from the flow tube 12 and a display unit 18 having a housing 21 is provided on an upper end of the handle 16. In one preferred embodiment, the flow tube 12, the handle 16 and the housing 21 of the display unit 18 are each made from stainless steel and are rigidly connected to each other by welded joints.

Figure 2:
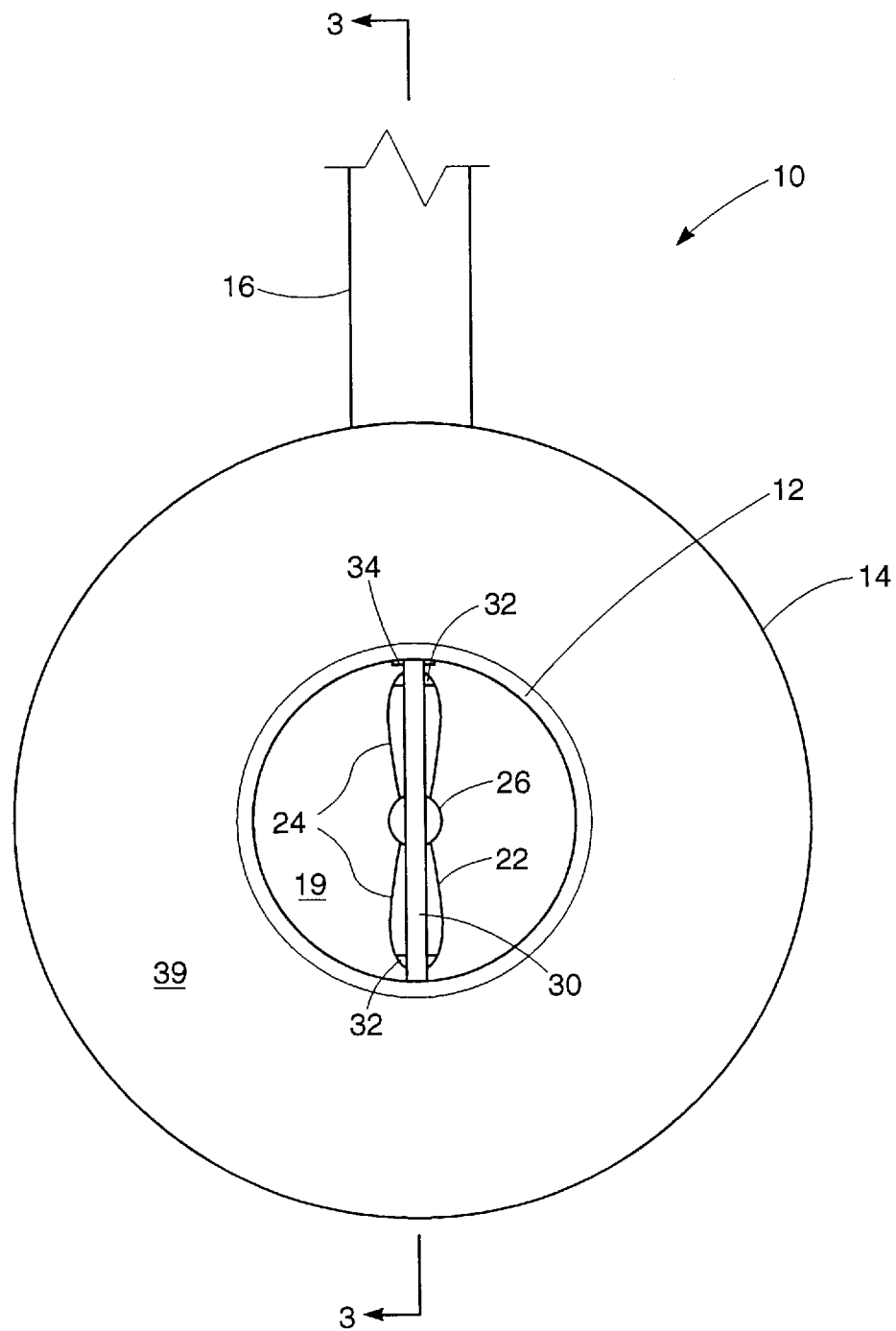
FIG. 2, in a front view, illustrates a lower portion of the flow meter of FIG. 1.
Figure 3:
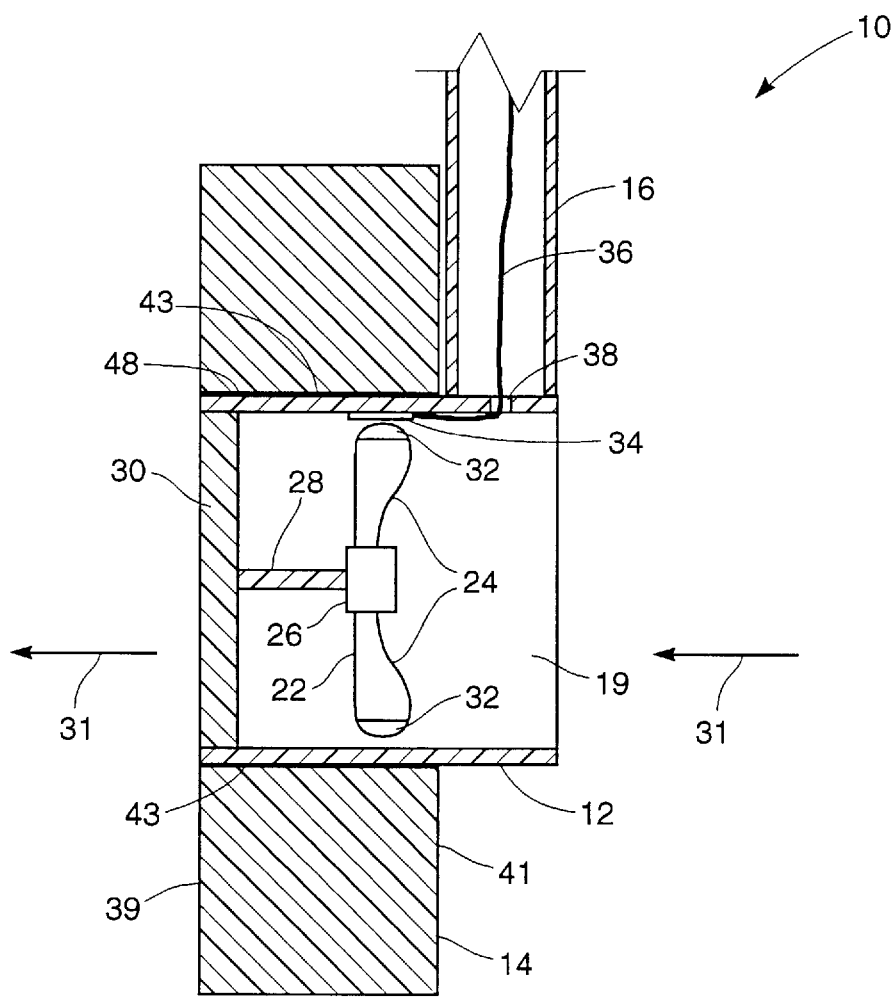
FIG. 3 is a cross-sectional view of the lower portion of the flow meter shown in FIG. 2, taken along the lines 3—3 of FIG. 2.

Referring to FIGS. 2 and 3, the cylindrical flow tube 12 is open at opposite ends so that it provides a cylindrical fluid passageway 19. The flow meter 10 includes a rotor 22 mounted for rotation within the fluid passageway 19. The rotor 22 includes at least two blades 24 which extend from a central hub 26. The rotor 22 is rotationally mounted on a shaft 28 which extends axially within the fluid passageway 19 and which is rigidly connected to a shaft support strut 30. The strut 30 extends diametrically across the width of the flow tube 12. In one preferred embodiment, the strut 30 and the shaft 28 are each formed from stainless steel, the shaft 28 is fixed to the center of the strut 30, and the ends of the strut 30 are fixed to opposing points on the inner surface of the flow tube 12. The rotor 22 is mounted within the flow tube 12 so that it will rotate when fluid flows in an axial direction, indicated by the arrows 31, through the flow tube 12.

A magnet 32 is provided on the ends of each of the blades 24 of the rotor 22. In one preferred embodiment, the magnets 32 are glued with a suitable waterproof adhesive to the trailing sides of the blades 24 at the outer portions of the blades 24. However, a recess or other receptacle in the blades 24 may be provided for the purpose of integrally securing the magnets 32 thereto. In the preferred embodiment, the hub 26 and blades 24 of the rotor 22 are constructed from a rigid plastic material.

The flow meter 10 includes a digital Hall-effect sensor 34 mounted on the flow tube 12. The sensor 34 is responsive to the fluctuations in the magnetic field in its vicinity that result when one of the magnets 32 rotate past the sensor 34. Examples of suitable Hall-effect sensors are Model No. SS21PE and No. SS22PE available from Honywell (Trademark). The Hall-effect sensor 34 is preferably secured by glue or other suitable means to the inner surface of the flow tube 12 at a point close to where the outer ends of the blades 24 rotate past. An electrical lead 36, which includes a plus line, a ground line and a sensor pulse output line, extends from the sensor 34 through a small hole 38 provided in an upper portion of the flow tube 12, and into the interior of the handle 16 (which is a hollow tube). The lead 36 extends upwards through the handle 16 to the display unit 18. Preferably, the sensor 34, the portion of the lead 36 contained within the flow tube 12, and the opening 38 in the flow tube 12 are covered with a silicon sealant which serves to further secure the sensor 34 and lead 36 to the flow tube 12 and prevent water from entering the handle 16 through the opening 38.

The magnitude of the magnets 32 and the location of the Hall-effect sensor are such that each time one of the magnets 32 rotates past the Hall-effect sensor 34 an electrical pulse output is generated on the sensor pulse output line contained within the lead 36 for processing as described in greater detail below. The magnets 32 are preferably no larger than required to reliably trigger the Hall-effect sensor 34. This is to keep the weight of the blades 22 at a minimum so that the rotor 22 will rotate under the low water flow conditions which exist at the end of the toilet flush cycle, and to minimize the momentum of the rotor 22 so that it will start rotating easily when water begins to flow through the fluid passageway 19 and stop rotating when water is no longer passing through the fluid passageway 19.

As illustrated, the rotor 22 has two blades 24 but the rotor 22 could include three or more blades. The blades 24 of the rotor 22 can take a variety of shapes, so long as the rotor 22 can be easily rotated under the force of fluid passing through the fluid passageway 19. For example, the blades 24 could have a turbine type profile, or a propeller type profile, or have a hydrofoil type design, as well as other profiles.

The resilient gasket 14 is preferably formed from water impermeable closed cell sponge material and has a cylindrical shape with planar front 39 and rear 41 surfaces and an annular opening 43 extending from the front 39 to rear 41 surfaces. As will be explained in greater detail below, the gasket 14 is provided to prevent fluid from circumventing the fluid passageway 19 when the flow meter is used to measure flow volume (or flow rate). The gasket 14 can be mounted on the front portion 48 of the flow tube 12 by sliding it thereon until a portion of its back surface 41 abuts against the handle 16. The gasket is retained in place by frictional engagement which results from contact between the wall of the opening 43 and the outer wall of the flow tube 12. Preferably the gasket 14 is removable so that it can be removed and replaced with a different gasket having a different outside diameter, thus allowing a single flow meter 10 to be used to measure flow volume through openings having a wide range of sizes. However, if required, the gasket 14 can be secured in place with an adhesive such as waterproof glue. Generally, the flow tube 10 will have an outside diameter that is less than the smallest dimension of the opening through which flow volume is to be measured, and the gasket 14 will have an outside diameter that is greater than the largest dimension of the opening through which flow volume is to be measured.

The closed cell sponge gasket 14 is preferably constructed from closed cell sponge having a density of between 3 pounds per cubic foot and 7 pounds per cubic foot, although densities outside this range may be suitable for some applications. The gasket may be formed by die cutting it from a sheet of appropriate closed cell sponge material.

Figure 4:
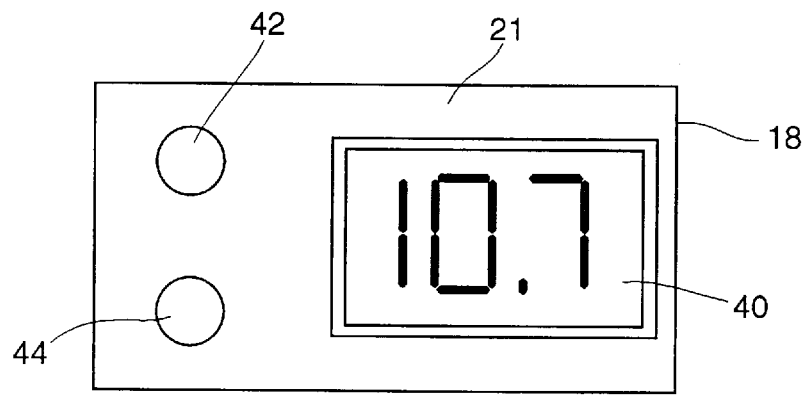
FIG. 4 is a top view of a display unit of the flow meter of FIG. 1.
Figure 5:
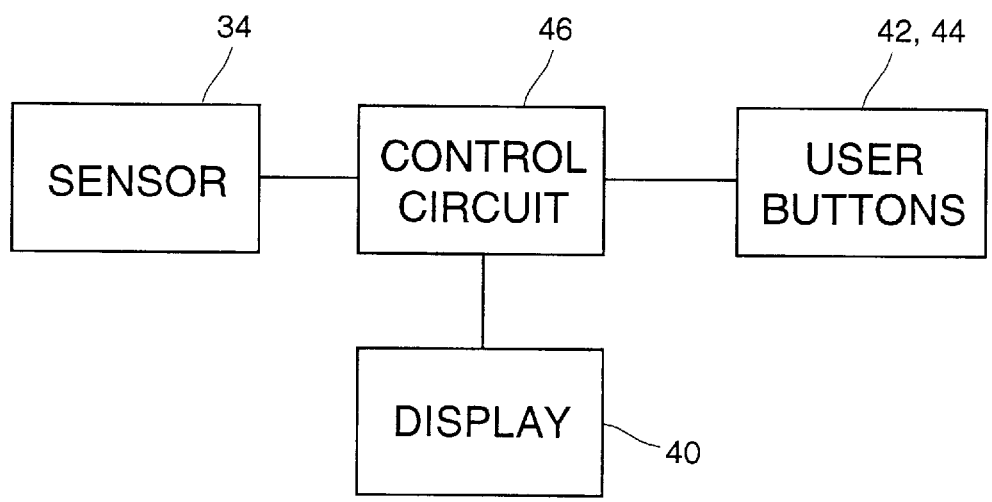
FIG. 5 is a simple block diagram of the electrical system of the flow meter of FIG. 1.

The three line electrical lead 36 from the Hall-effect sensor 34 extends up through the shaft 16 to the display unit 18. With reference to FIG. 4, the display unit 18 includes an upward facing digital LCD or LED display 40 located in the upper surface of the display housing 21. The display 40 is for displaying the flush volume of the toilet being tested and is driven by a control circuit 46 which is also housed within the housing 21 of the display unit 18. The control circuit 46 is connected to the sensor pulse output line of the sensor 34 and also to user interface buttons 42 and 44 which are located on the display unit 18. The housing 21 also preferably houses a power supply comprised of one or more batteries which are connected to the plus and ground lines of the sensor 34 and which also supply power to the control circuit 46 and the display 40. The control circuit 46 preferably includes a suitably programmed microprocessor together with associated RAM and ROM and appropriate interfaces for receiving inputs from the sensor 34, the user buttons 42 and 44, and for driving the display 40.

In operation, the flow meter 10 can be used to measure the flush volume of a toilet. As shown in FIG. 1, in order to measure the flush volume of a toilet the lower portion of the flow meter 10 is inserted into the toilet bowl 20 so that the flow tube 12 is located in the water discharge path of the toilet bowl 20. The dimensions of the flow meter 10 are such that the flow tube 12 can be positioned in the well 51 at the bottom of the toilet bowl with its front end 48 at the discharge opening 50 which leads to the siphon 52 (or trap) of the toilet bowl 20. The flow tube 12 has an outer diameter which is less than the smallest distance across the discharge opening 50, and the gasket 14 has an outer diameter which is somewhat greater than the largest distance across the discharge opening 50. By manipulating the handle 16, the front end 48 of the flow tube 12 can be pressed into the discharge opening 50 until the gasket 14 provides a substantially water impermeable seal between the walls of the discharge opening 50 and the flow tube 12. It will be appreciated by those skilled in the art of toilet bowls that the discharge opening 50 leading to the siphon 52 is generally not a circular opening, with the result that when the front end 48 of the flow tube 12 is inserted into the discharge opening 50, the gasket 14 will be compressed different degrees around its circumference. Although the outer diameter of the gasket 14 is greater than the greatest distance across the opening 50, the gasket 14 is preferably small enough so that at least a portion of it can be compressed into the opening 50.

The upwardly extending handle 16 of the flow meter 10 allows the flow tube 12 and gasket 14 to be placed at the discharge opening 50 without requiring a user to submerge his hands in the water contained in the toilet bowl 20. The handle 16 is preferably long enough so that when the flow tube 12 is located at the discharge opening 50, the display unit 18 is located above the seating area 54 of the toilet 20, thus allowing the display 40 to be easily read.

Once the flow tube 12 has been located in the discharge opening 50 so that the gasket 14 provides a seal between the walls of the discharge opening 50 and the flow tube 12, the flow meter 10 can be used to measure the flush volume of the toilet. In order to initiate the flow volume reading process, button 42 of the display unit 18 is pressed. The button 42 serves as a start/reset button and its depression indicates to the control circuit 46 that a new flush volume reading is to be taken. The user then activates the flush handle or lever (not shown) of the toilet bowl 20 to activate the flush cycle. As well known in the art, activation of the flush handle causes a predetermined amount of water to enter the toilet bowl 20 from a tank (in the case of a tank flush toilet) or from a pressurized water source (in the case of a flush valve toilet). The increased level of the water within the toilet bowl 20 causes the water level in the siphon 52 to overflow the siphon elbow 56 and subsequently exit the toilet through the waste pipe 58. The siphon effect created by the water passing through the siphon 52 and into the waste pipe 58 causes substantially all of the water within the bowl 20 to leave the toilet, after which the toilet bowl 20 again fills with water to a predetermined standing level that is lower than the height of the siphon elbow 56.

During the entire flush cycle, substantially all the water passing through the discharge opening 50 passes through the fluid passageway 19 of the flow tube 12 because the gasket 14 impedes water from circumventing the fluid passageway 19. As the water passes through the fluid passageway 19 it causes the rotor 22 to rotate. Each time a magnet 32 passes by the Hall-effect sensor 34 an electronic pulse is sent along the pulse signal output line of the lead 36 to the control circuit 46. The control circuit 46 is pre-calibrated according to the diameter of the flow tube 12 and the characteristics of the rotor 22 so that the control circuit 46 can count the pulses from the Hall-effect sensor 34 and generate an output signal that is representative of the volume of water which passes through the flow tube 12. At the conclusion of the flush cycle, once the rotor 22 has stopped rotating and the control circuit 46 stops receiving pulses from the Hall-effect sensor 34, the control circuit 46 will cause a number representative of the flush volume to be displayed at the display 40. As shown in FIG. 4, an exemplary display volume of 10.7 litres is shown on the display 40. If desired, the control circuit 46 can be programmed to provide a continual "count up" display on the display 40 during the entire flush process.

Preferably, the control circuit 46 is programmed appropriately and contains sufficient memory so that it will keep a log of the tests performed until instructed to delete the stored test results and start a new log. The button 44 allows a user to toggle between different informational outputs which can be provided on the display 40 by the control circuit 46. For example, in one preferred embodiment, by successively pressing the button 44 the user can cause the control circuit 46 to selectively display at display 40 the most recent reading taken in either litres or gallons, display the total number of tests taken, display the total flush volume of all tests, and display an average flush volume.

As mentioned above, at the start of each test, the flow meter 10 is reset by pressing the reset/on button 42. The control circuit 46 preferably includes a timing circuit so that if the reset button 42 is not pressed within a predetermined time period the flow meter 10 will go into a battery saving standby mode during which time power will not be provided to the Hall-effect sensor 34 or the display 40. Pressing the reset/on button 42 reactivates the flow meter 10. Activation of the buttons 42 and 44 together when he flow meter 40 is not in battery saving mode will preferably cause the log stored in the memory of the control circuit 46 to be deleted so that new averages and totals can be calculated for subsequent tests.

In one exemplary embodiment of the invention, the flow tube 12 has an axial length of approximately 1.5 inches and a diameter of approximately 1.5 inches, the gasket 14 has a thickness of approximately 1 inch from its front 39 to back 41 surfaces and an outer diameter of 3.5 inches, and the handle 16 is an elongate tubular structure with an outside diameter of approximately ½ inch and a length of between 20 inches to 35 inches. It will of course be appreciated that the flow tube 12 and the gasket 14 can have dimensions other than those stated above so long as the gasket 14 is sufficient to substantially prevent water from circumventing the fluid passageway 19 provided through the flow tube 12.

As illustrated in FIG. 1, the handle 16 extends upwardly from the rearward portion of the flow tube 12 at a slight angle from the vertical. However, the handle 16 could also extend upwardly at an angle perpendicular to the axis of the flow tube 12. It is also possible that the flow meter 10 could be constructed without the handle 16, in which case the display unit 18 would be attached directly to the flow tube 12, although such a configuration would require a water tight display unit 18, and also require the user to submerge his hand under water.

It will be understood that the gasket 14 can be formed from suitable resilient compressible materials other than closed cell sponge. As well, the flow tube, handle and display unit of the flow meter 10 can be constructed from a rigid material such as PVC rather than from stainless steel. As illustrated in FIG. 3, the Hall-effect sensor 34 is mounted on an interior surface of the flow tube 12 at an upper portion thereof. However, it will be appreciated that the Hall-effect sensor 34 could alternatively be mounted on the outside of the flow tube 12 if desired. Additionally, not all of the blades of the rotor 22 need contain a magnet so long as the rotor 22 is properly balanced. The rotational shaft 28 can extend through the hub 26 to a further shaft support strut (not shown) if additional support is required for the rotor 22.

Many known methods can be used to measure the volume of water passing through the flow tube 12 other than employing a Hall-effect sensor to pick up differences in magnetic field caused by a magnet embedded in a turbine blade. For example, the methods disclosed in the above-mentioned issued U.S. patents could be employed for measuring the flow of fluid through the fluid passageway 19. Furthermore, the control circuit 46 could be implemented in a wide variety of ways to perform a wide variety of functions. If desired, a logic circuit could be used in place of a microprocessor.

It will be appreciated that the flow meter 10 provides a portable flow meter which can be efficiently and easily used to measure the flush volume of flush tank and flush valve toilets without requiring the supply line to the toilet to be broken. A notable feature of the flow meter 10 is that it can be used the measure the flow of fluid through with discharge openings of unknown sizes as the gasket 14 forces fluids passing through the discharge opening or mouth to pass through the flow tube 12, which has a known diameter. The handle 16 allows the flow meter to be used without requiring the person performing the measurement to get their hands wet or have any contact with the toilet bowl 20 or the water therein.

It will be appreciated that the flow meter 10 could be used for measuring the flow of fluid through other openings of unknown diameters in addition to the discharge openings of toilet bowls. The flow meter 10 could also be configured to calculate and display the flow rate of any fluid passing through the flow tube 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A portable flow meter for determining the flush volume of a toilet having a toilet bowl with a discharge opening, the flow meter comprising:

a flow tube having a fluid passageway therethrough;

a rotor having blades and disposed in said fluid passageway for rotation by the flow of a fluid through said fluid passageway;

detection means for detecting rotation of said rotor and generating an output in response thereto which is representative of the volume of fluid passing through said fluid passageway;

display means for displaying said output; and a resilient compressible gasket mounted on said flow tube, wherein in use said flow tube together with said gasket can be positioned in the toilet bowl such that substantially all fluid passing through the discharge opening during the flush cycle of the toilet will be forced through said fluid passageway.

2. A flow meter according to claim 1 including an elongate handle having an upper end and a lower end, said lower end being connected to said flow tube.

3. A flow meter according to claim 2 including a display housing connected to the upper end of said handle, wherein said display means includes a digital display mounted in said housing and said handle is of sufficient length to support said display housing above a high water mark of the toilet bowl when said flow meter is in use.

4. A flow meter according to claim 3 wherein said gasket is made from water impermeable material and is removably mounted on said flow tube.

5. A flow meter according to claim 4 wherein said gasket is secured to said flow tube by frictional engagement therebetween.

6. A flow meter according to claim 5 wherein said gasket is made from closed cell sponge.

7. A flow meter according to claim 6 wherein said closed cell sponge has a density of between 3 pounds per cubic foot to 7 pounds per cubic foot.

8. A flow meter according to claim 3 wherein said flow tube has a generally cylindrical shape with a front portion and a rearward portion, said gasket being mounted on said front portion, and said handle extending upwards from said rearward portion.

9. A flow meter according to claim 8 wherein said front portion of said flow tube has an outer diameter less than the smallest distance across the discharge opening and said gasket has an outer diameter larger than the largest distance across the discharge opening.

10. A flow meter according to claim 3 wherein said detection means comprises:

magnetic field affecting means carried by at least one of said blades;

sensor means mounted on said flow tube for generating electrical signals in response to the movement of said magnetic field affecting means caused by rotation of said rotor; and a control circuit for counting said signals and generating said output in response to said electrical signals.

11. A flow meter according to claim 10 wherein said magnetic field affecting means includes a magnet and said sensor means includes a Hall-effect sensor.

12. A flow meter according to claim 11 wherein a magnet is mounted on each of said blades.

13. A portable flow meter for measuring the flow of fluid through different openings having a range of sizes, comprising:
- a flow tube having an axial fluid passageway therethrough;
- measuring means for measuring the flow of fluid through said fluid passageway, said measuring means including a rotor disposed in said fluid passageway and rotatably solely by the flow of fluid through said fluid passageway;
- display means for displaying an output from said measuring means; and
- a resilient, compressible, water impermeable gasket member extending around an outer periphery of said flow tube, said gasket member and said flow tube being arranged such that in use said gasket member can provide a substantially fluid tight seal between said flow tube and the periphery of the opening through which the flow of fluid is being measured so that substantially all fluid passing through the opening will pass through said fluid passageway.

14. A flow meter according to claim 13 further including an elongate handle having an upper end and a lower end, said lower end being connected to said flow tube.

15. A flow meter according to claim 14 wherein said gasket is removably mounted on said flow tube and is secured to said flow tube by frictional engagement therebetween.

16. A flow meter according to claim 15 wherein said gasket is made from closed cell sponge having a density of between 3 pounds per cubic foot to 7 pounds per cubic foot.

17. A flow meter according to claim 15 wherein said rotor has a plurality of blades; said measuring means includes magnetic field affecting means mounted on at least one of said blades, sensor means mounted on said flow tube for generating electrical signals in response to the movement of said magnetic field affecting means caused by rotation of said rotor, and a control circuit for counting said signals and generating an output representative of the volume of liquid passing through said fluid passageway; and said display means comprises a digital display located at the upper end of said handle for displaying said output.

18. A flow meter according to claim 17 wherein said magnetic field affecting means includes a magnet and said sensor means includes a Hall-effect sensor.

19. A flow meter according to claim 18 wherein the dimensions of said flow tube and said gasket are such that the flow meter can be used to measure the flush volume of a toilet by positioning said flow tube and said gasket at a discharge opening leading to a siphon of said toilet.

20. A flow meter according to claim 13 wherein said output is representative of the flow rate of fluid passing through said fluid passageway.

21. A method for measuring the flush volume of a toilet having a toilet bowl with a discharge opening, comprising the steps of:
- providing a flow tube having an axial fluid passageway therethrough and a resilient compressible gasket mounted thereon;
- providing means for measuring and displaying the volume of fluid passing through said fluid passageway;
- inserting a portion of said flow tube into said discharge opening until said gasket forms a substantially water impermeable seal between said flow tube and the walls of said discharge opening so that substantially all fluid passing through the discharge opening will pass through said fluid passageway;
- activating the flush cycle of the toilet; and
- measuring the volume of fluid passing through said passageway during the flush cycle with said measuring and displaying means.

* * * * *